(12) United States Patent
Fan

(10) Patent No.: US 6,270,102 B1
(45) Date of Patent: Aug. 7, 2001

(54) DRIVE MECHANISM FOR SCOOTER

(76) Inventor: Ronnie Chee Keung Fan, Lafayette, CA (US)

( * ) Notice: Subject to any disclaimer, the term of this patent is extended or adjusted under 35 U.S.C. 154(b) by 0 days.

(21) Appl. No.: 09/419,507

(22) Filed: Oct. 18, 1999

(51) Int. Cl.$^7$ ....................................................... B62M 1/00
(52) U.S. Cl. ........................................... 280/252; 280/221
(58) Field of Search .................................... 280/220, 221, 280/252, 253, 255, 256, 257, 258, 261

(56) References Cited

U.S. PATENT DOCUMENTS

| | | |
|---|---|---|
| 1,330,011 | * 2/1920 | Russo . |
| 1,551,412 | * 2/1925 | Lopez . |
| 1,558,851 | * 5/1925 | Edwards et al. . |
| 1,998,293 | * 4/1935 | Sweany . |
| 2,031,015 | * 2/1936 | Stevenson . |
| 5,163,696 | * 11/1992 | Pesco, Sr. ............................. 280/221 |
| 5,224,724 | * 7/1993 | Greenwood ............................ 280/221 |

\* cited by examiner

Primary Examiner—Kevin Hurley
(74) Attorney, Agent, or Firm—Howard Cohen

(57) ABSTRACT

A scooter having a rider-operated mechanism for driving the scooter forward includes an endless chain loop for transferring propulsion to one wheel of the scooter. In one aspect, a first sprocket wheel is mounted in a vertical plane below the footboard, and a drive link extends from a pedal to an eccentric mounting pin on the sprocket wheel. A second sprocket wheel assembly, including a ratchet gear, is mounted on the shaft that supports the driving wheel, and an endless loop chain extends about the two sprocket wheels below the footboard. When the pedal is depressed, the link rotates the first sprocket wheel and the chain, driving the second sprocket wheel to rotate the drive wheel and propel the scooter. In another embodiment, a first gear wheel is mounted in a vertical plane below the footboard, and a second gear is mounted coaxially with the first sprocket wheel. and disposed to engage the first gear. A drive link extends from the pedal to an eccentric mounting pin on the first gear wheel. When the pedal is depressed, the drive link rotates the first gear wheel, which acts through the second gear to rotate the first sprocket wheel and the chain. Similar mechanisms may be provided extending substantially above the footboard. A unidirectional ratchet mechanism may be coupled to the gear wheel of any embodiment to permit the pedal and drive link to rotate the gear wheel only in the proper clockwise or counterclockwise direction and allow only forward propulsion.

15 Claims, 5 Drawing Sheets

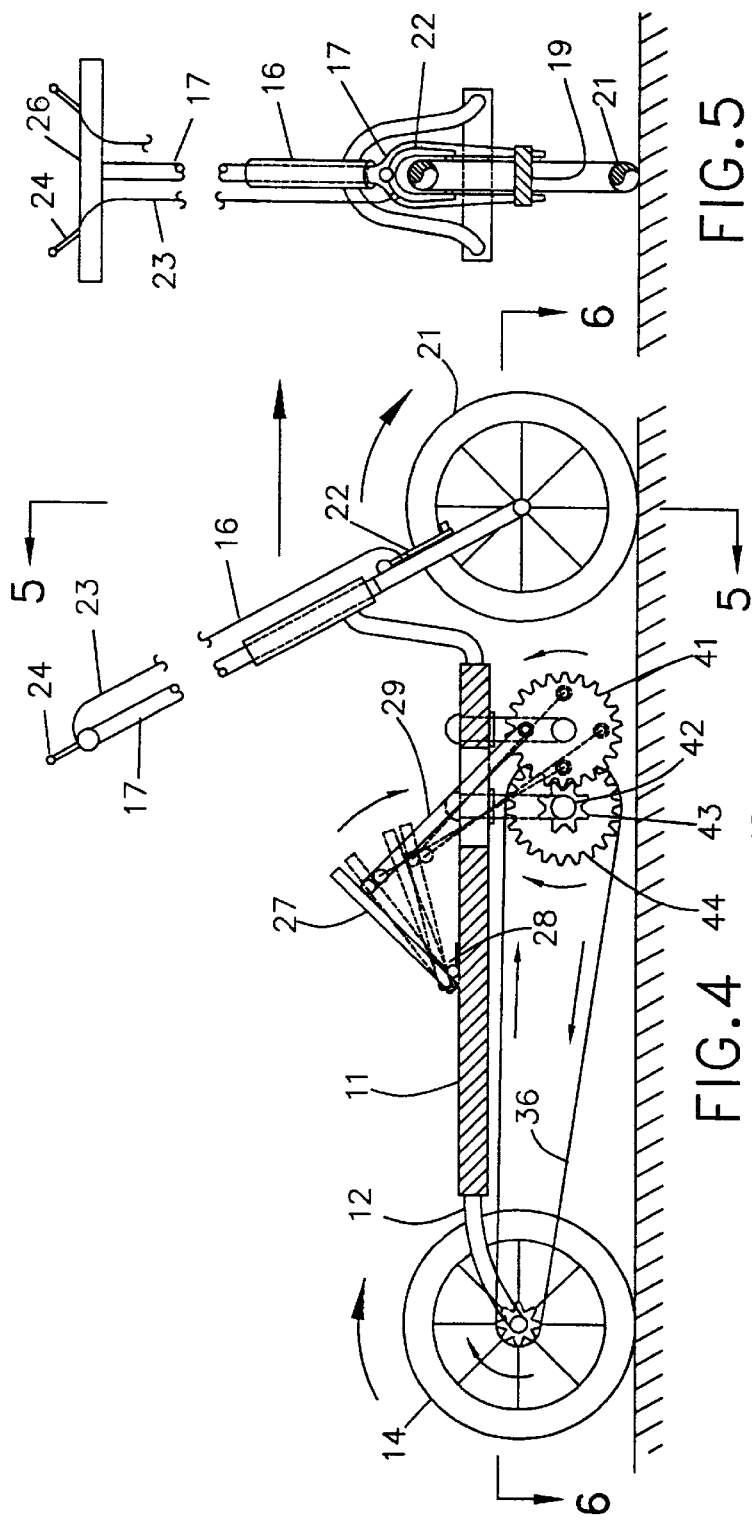
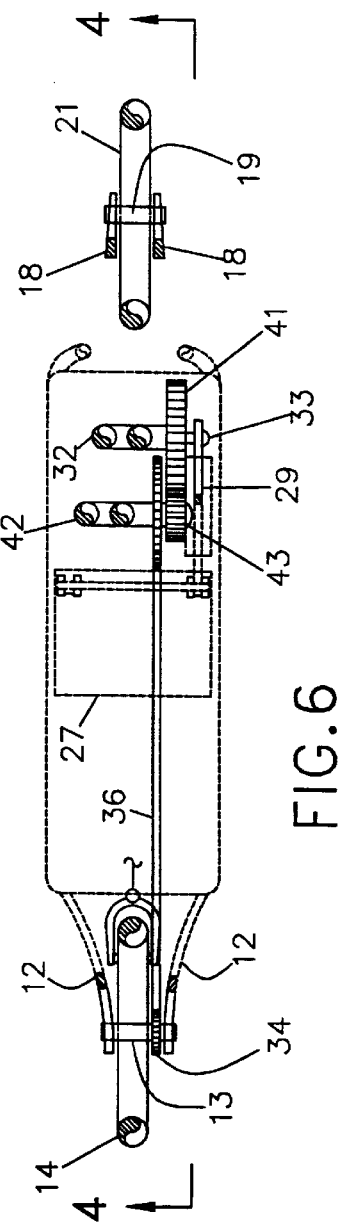

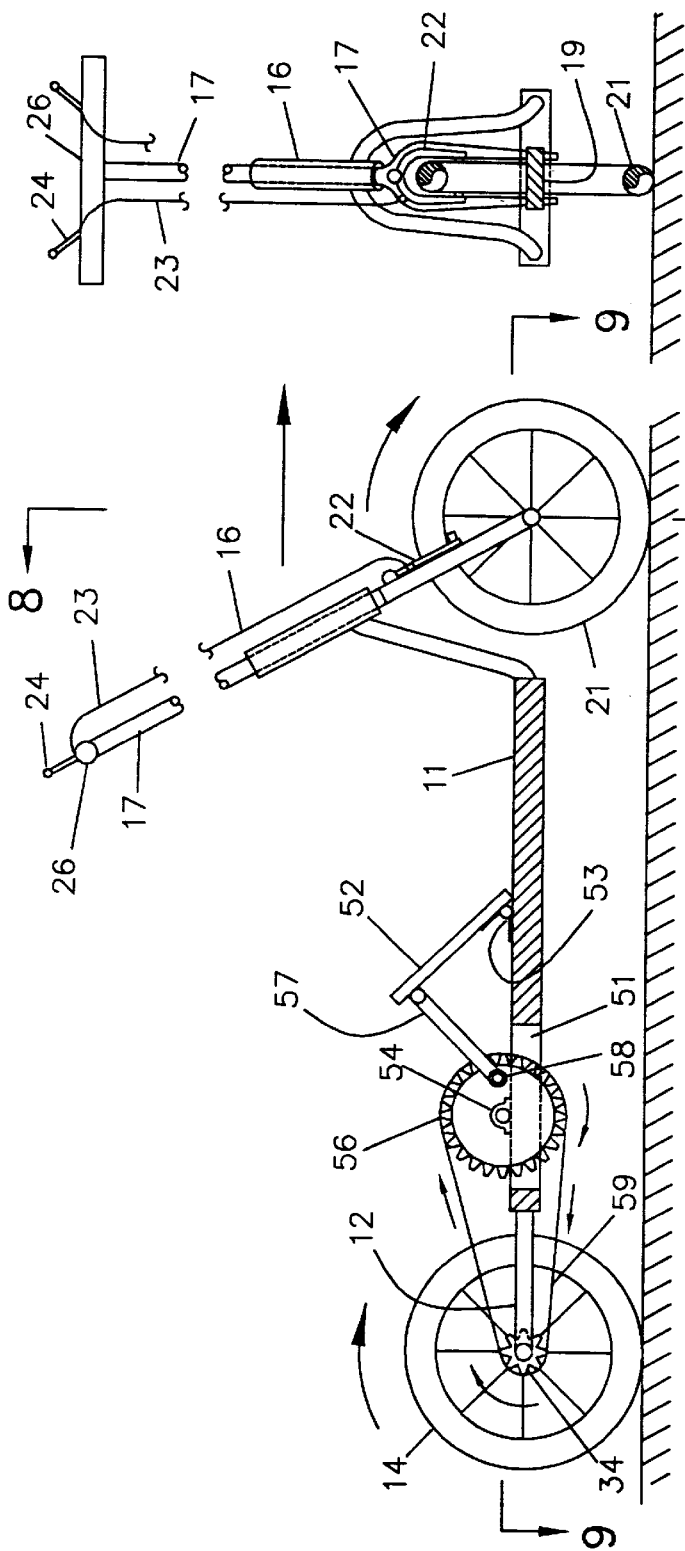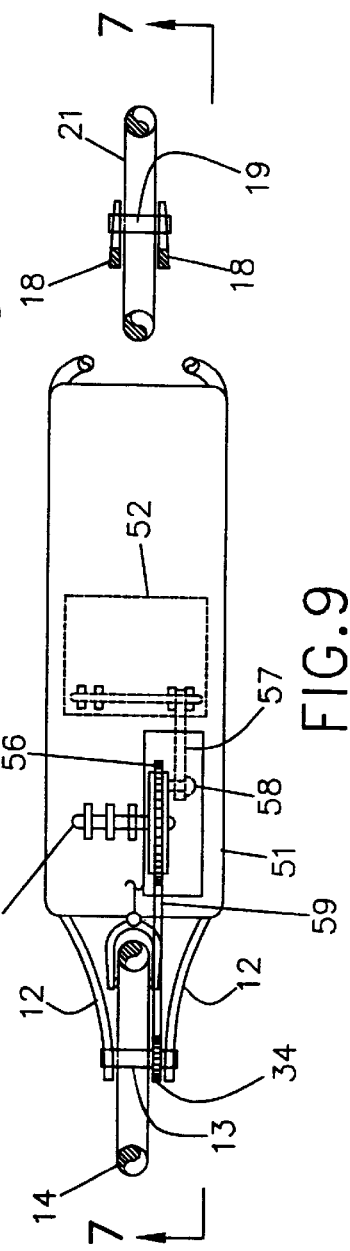
FIG. 8
FIG. 7
FIG. 9

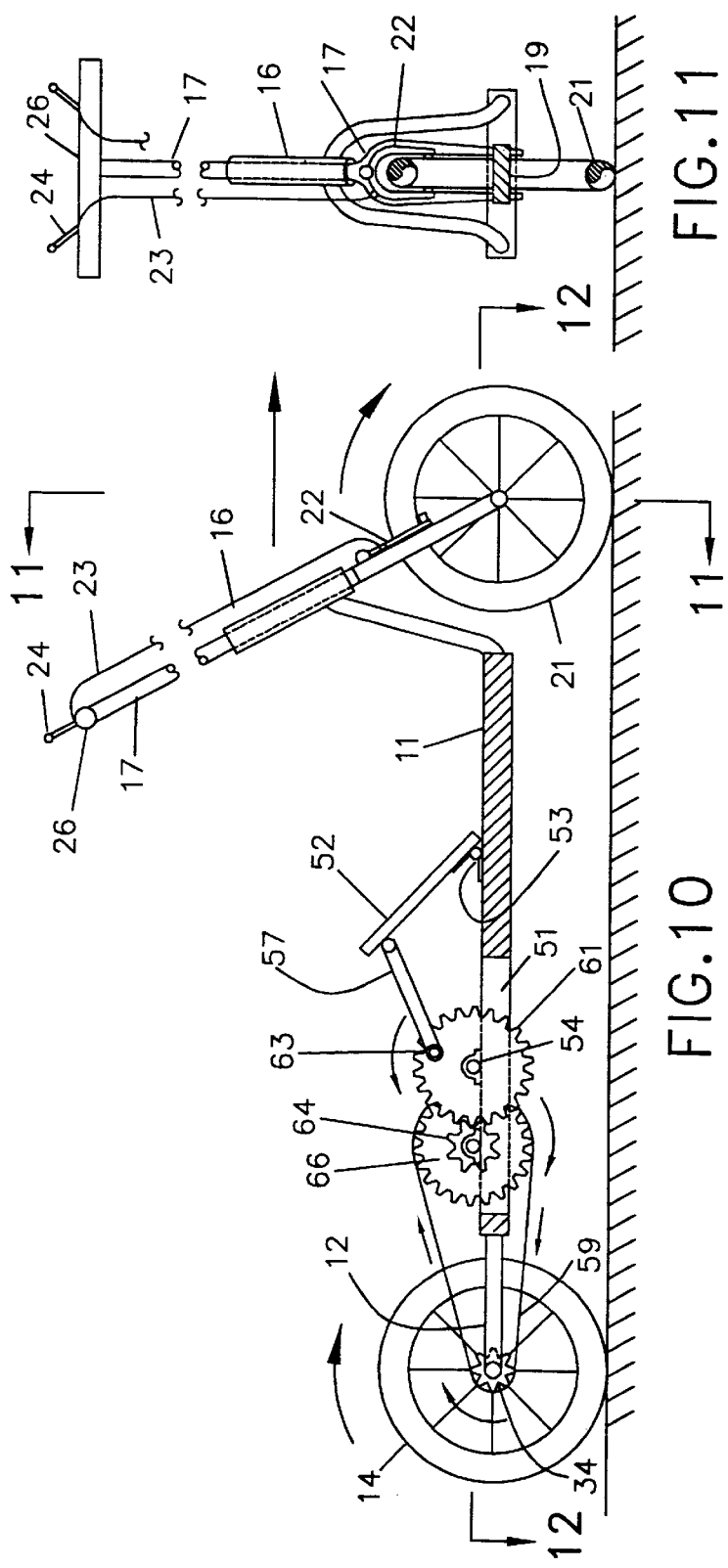
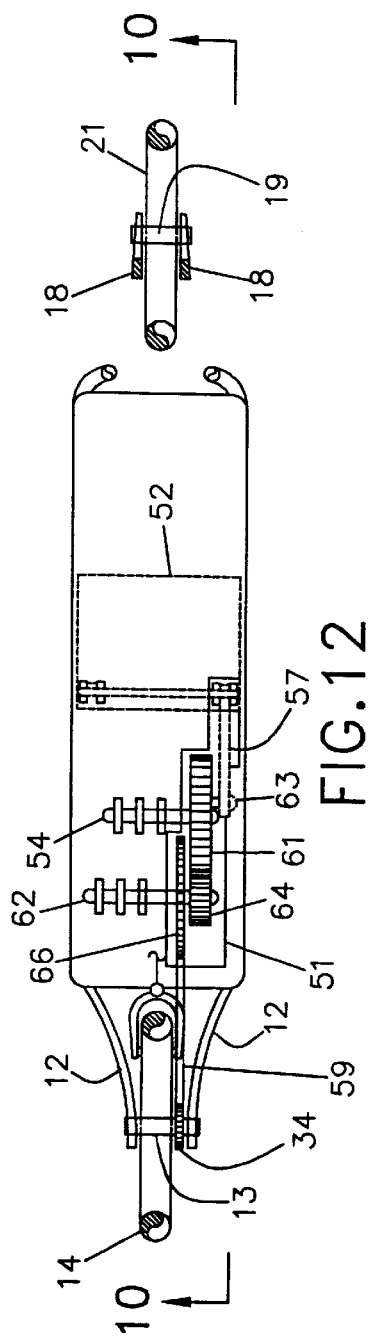

DRIVE MECHANISM FOR SCOOTER

REFERENCE TO RELATED APPLICATIONS

The subject matter of this application is divulged in part in Disclosure Document No. S00467, dated Jul. 17, 1997, which is cited and preserved in my application Ser. No. 09/100,149, filed Jun. 18, 1998. Other portions of the subject matter are disclosed in Disclosure Document No. SV01087, dated Oct. 1, 1999.

BACKGROUND OF THE INVENTION

This invention relates to scooters, and, more particularly, to a scooter that includes a drive mechanism actuated by the scooter passenger.

A scooter generally is comprised of a rear wheel and a steerable front wheel joined by a chassis which supports a platform on which the rider stands. In its simplest form, the scooter is propelled by the rider using one foot to push rearwardly against the pavement in a one-leg stride, while the other leg supports most of the rider's weight on the platform. Although the rider can alternate the use of either leg to avoid fatigue, it is recognized that this form of propulsion is tiresome. Moreover, it is inefficient, in that increasing speed requires that the propelling foot be pushed rearwardly with concomitantly increasing speed to gain any propulsive effect. At relatively low speeds (compared to a bicycle), the rider can gain little acceleration by continuing to stride, even while the effort becomes arduous.

Because of this and other problems inherent in scooter designs, various scooter drive mechanisms have been devised in the prior art. For example, a pedal mounted on the platform may be connected to a rack gear that drives a pinion gear on the rear wheel shaft, whereby reiterative pedal depression may drive the rear wheel and produce forward motion. Likewise, the pedal may be joined to a drive link that is connected to a crank or eccentric on the rear wheel shaft to convert the oscillating motion of the pedal to rotational drive motion at the rear wheel. Various improvements to these concepts include compound gear drives, dual pedals, chain drives, and other mechanisms known in mechanical engineering.

One problem intrinsic to these designs is that their mechanisms generally extend below the scooter platform, so that the platform remains available to accommodate the feet of the rider. However, by projecting below the platform, the drive mechanisms reduce the ground clearance and invite the possibility of collision between the drive mechanism and relatively small obstacles on the pavement. Moreover, the ability to negotiate bumps, holes, curbs, and uneven pavement is reduced. Although the platform may be supported higher to accommodate the drive mechanism therebelow with sufficient ground clearance, this expedient raises the center of mass of the rider, which may cause instability, and renders stepping on and off the scooter platform more problematic.

SUMMARY OF THE INVENTION

The present invention generally comprises a scooter having a rider-operated mechanism for driving the scooter in forward motion, and includes the use of an endless chain loop for transferring propulsion to one wheel of the scooter.

The scooter generally includes front and rear wheels joined to a chassis which supports a footboard or platform extending longitudinally between the two wheels. One of the wheels is steerable, and the other wheel is driven by the propulsive mechanism. Although the invention will be described with reference to a steerable front wheel and a propelled rear wheel, it may be noted that the rear wheel may be the steering element, and the front wheel may be propelled by the mechanism.

In one aspect, the invention includes a pedal pivotally mounted to the footboard, and a spring arranged to urge the pedal to extend obliquely upwardly from the footboard. A first sprocket wheel is mounted in a vertical plane below the footboard, and a drive link extends from the pedal to an eccentric mounting pin on the sprocket wheel. A second sprocket wheel assembly, including a ratchet gear, is mounted on the shaft that supports the driving wheel, and an endless loop chain extends about the two sprocket wheels below the footboard. When the pedal is depressed, the link rotates the first sprocket wheel and the chain, which in turn drives the second sprocket wheel to rotate the drive wheel and propel the scooter. The ratchet assembly allows the driving wheel to freewheel and glide on level or downhill surfaces. The spring returns the pedal to the oblique upwardly extending disposition, whereby the process is reiterated to propel the scooter forward smoothly and continuously.

In another embodiment, the invention includes a pedal pivotally mounted to the footboard, and a spring arranged to urge the pedal to extend obliquely upwardly from the footboard. A first sprocket wheel is mounted in a vertical plane below the footboard, and a second sprocket wheel assembly, including a ratchet gear, is mounted on the shaft that supports the driving wheel, with an endless loop chain extending about the two sprocket wheels below the footboard. A first gear wheel is mounted in a vertical plane below the footboard, and a second gear is mounted coaxially with the first sprocket wheel. and disposed to engage the first gear. A drive link extends from the pedal to an eccentric mounting pin on the first gear wheel. When the pedal is depressed, the drive link rotates the first gear wheel, which acts through the second gear to rotate the first sprocket wheel and the chain. As in the previous embodiment, the chain rotates the drive wheel and propels the scooter, and the ratchet gear allows the scooter to freewheel and glide when not being pedaled. The gear ratio of the two gears is chosen to provide greater velocity.

In a further embodiment, a pedal is provided as described previously. A first sprocket wheel is mounted in a vertical plane in a slot formed in the footboard, and a drive link extends from the pedal to an eccentric mounting pin on the sprocket wheel. A second sprocket wheel assembly, including a ratchet gear, is mounted on the shaft that supports the driving wheel, and an endless loop chain extends about the two sprocket wheels. The first sprocket wheel and chain occupy a very small portion of the space between the bottom of the footboard and the ground, thereby maximizing ground clearance of the scooter. When the pedal is depressed, the link rotates the first sprocket wheel and the chain, which in turn drives the second sprocket wheel to rotate the drive wheel and propel the scooter.

In an additional embodiment, a pedal is provided as in the previous embodiments, and a first sprocket wheel is mounted in a vertical plane in a slot formed in the footboard. A second sprocket wheel assembly, including a ratchet gear, is mounted on the shaft that supports the driving wheel, with an endless loop chain extending about the two sprocket wheels. A first gear wheel is mounted in a vertical plane in the slot in the footboard, and a second gear is mounted coaxially with the first sprocket wheel and disposed to engage the first gear. A drive link extends from the pedal to an eccentric mounting pin on the first gear wheel. When the pedal is depressed, the drive link rotates the first gear wheel, which acts through the second gear to rotate the first sprocket wheel and the chain. As in the previous embodiment, the chain rotates the drive wheel and propels the scooter, and the ratchet gear allows the scooter to freewheel and glide when not being pedaled. The chain, sprocket wheels and gears occupy a minimum of the space below the footboard to maximize ground clearance, and the gear ratio of the two gears is chosen to optimize the velocity characteristic of the scooter.

A unidirectional ratchet mechanism may be coupled to the gear wheel of any embodiment to permit the pedal and drive link to rotate the gear wheel only in the proper clockwise or counterclockwise direction and allow only forward propulsion. The ratchet mechanism includes a pin extending from the gear wheel, and a latch arm pivotally secured to the footboard and including a distal end disposed to engage the pin as the gear wheel rotates. The distal end of the latch arm includes a convex curved edge which enables the pin to rotate in one direction and impinge on and rotationally displace the distal end of the latch arm, and further includes a concave end portion which engages the pin when the gear wheel rotates in the opposite direction, causing further rotation in the opposite direction to be blocked.

BRIEF DESCRIPTION OF THE DRAWING

FIG. 4 is a side elevation of another embodiment of the mechanically driven scooter of the present invention.

FIG. 5 is a front elevation of the scooter of the invention, taken along line 5—5 of FIG. 4.

FIG. 6 is a cross-sectional top view of the embodiment of FIGS. 4 and 5, taken along line 6—6 of FIG. 4.

FIG. 7 is a side elevation of a further embodiment of the mechanically driven scooter of the present invention.

FIG. 8 is a front elevation of the further embodiment of the scooter of the invention, taken along line 8—8 of FIG. 7.

FIG. 9 is a cross-sectional top view of the embodiment of FIGS. 7 and 8, taken along line 9—9 of FIG. 7.

FIG. 10 is a side elevation of an additional embodiment of the mechanically driven scooter of the present invention.

FIG. 11 is a front elevation of the further embodiment of the scooter of the invention, taken along line 11—11 of FIG. 10.

FIG. 12 is a cross-sectional top view of the embodiment of FIGS. 10 and 11, taken along line 12—12 of FIG. 10.

DESCRIPTION OF THE PREFERRED EMBODIMENT

Figure 1:
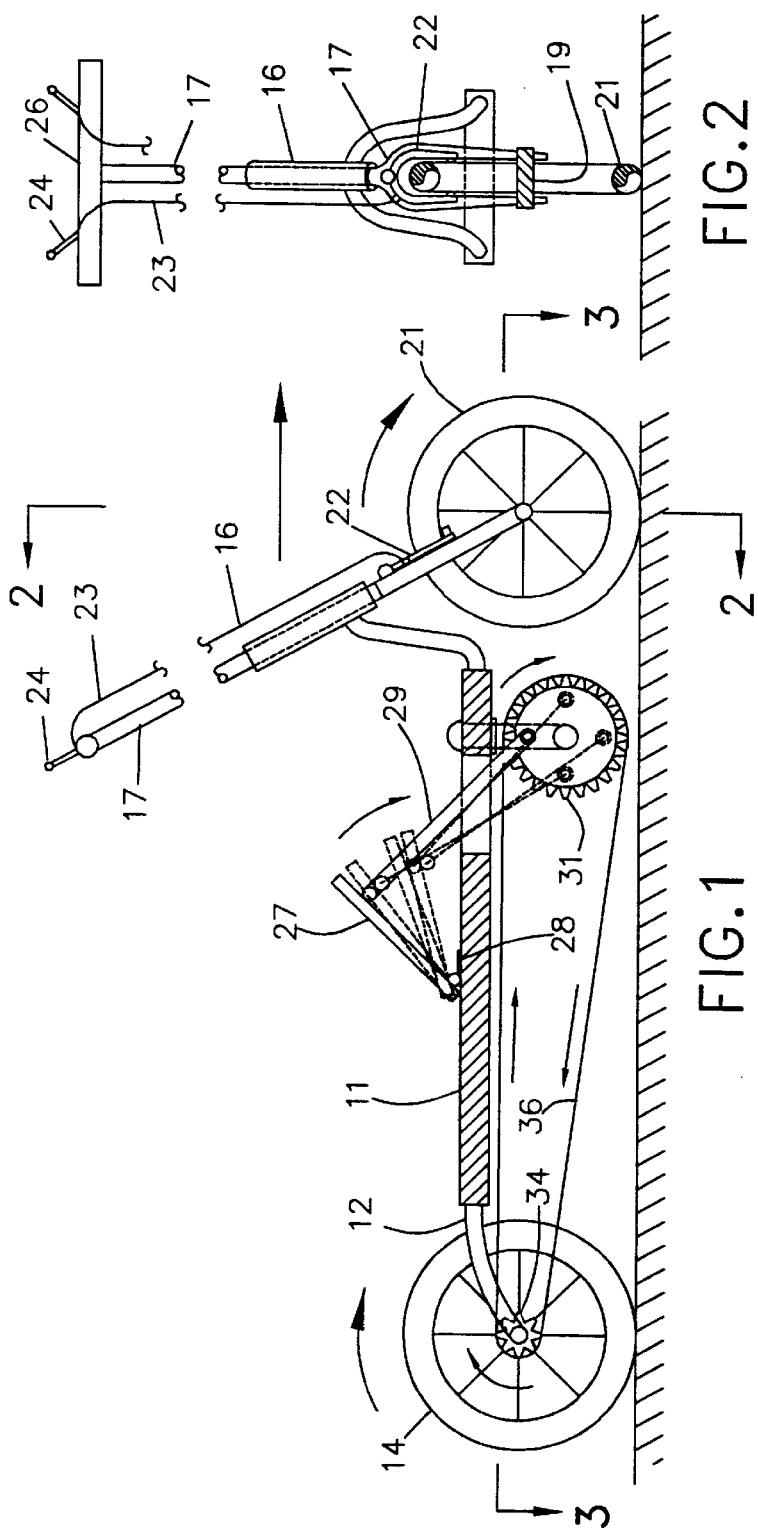
FIG. 1 is a side elevation of the mechanically driven scooter of the present invention.
Figure 2:
FIG. 2 is a front elevation of the mechanically driven scooter of the present invention, taken along line 2—2 of FIG. 1.
Figure 3:
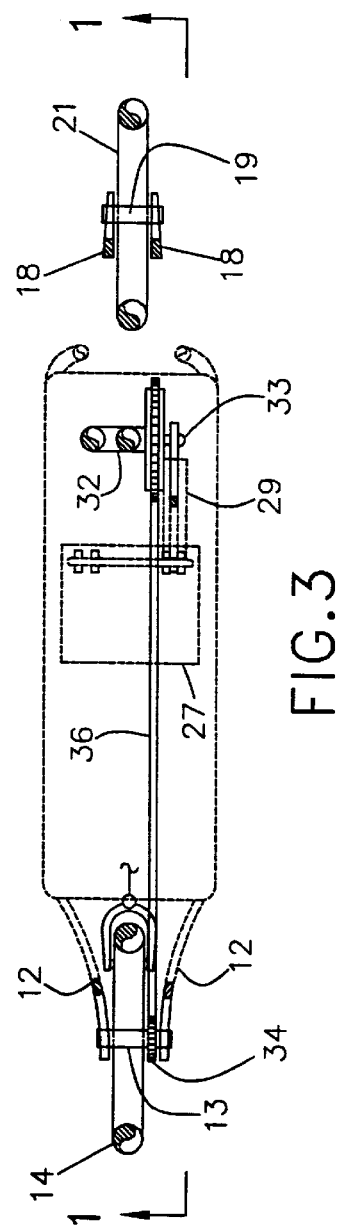
FIG. 3 is a cross-sectional top view of the mechanically driven scooter, taken along line 3—3 of FIG. 1.

The present invention generally comprises a scooter having a rider-operated mechanism for driving the scooter in forward motion, and includes the use of an endless chain loop for transferring propulsion to one wheel of the scooter. With reference to FIGS. 1–3, the scooter generally includes a platform or footboard 11 supported on a chassis comprised of longitudinally extending, laterally spaced tubular supports 12. At the rear of the scooter, the supports 12 secure therebetween a rear axle 13, on which is mounted a rear wheel 14. At the front of the scooter, the supports 12 converge to join a steering tube housing 16 extending upwardly. A steering tube 17 is secured in the housing 16, and includes a fork 18 at the lower end thereof. A front axle 19 is supported by the fork 18, and a front wheel 21 is mounted on the front axle 19 in freely rotating fashion. A brake assembly 22, similar to a bicycle caliper brake, is secured to the steering tube 17, and is operated by a bowden cable 23 extending to a brake lever assembly 24 mounted on a handlebar 26 at the upper end of the steering tube 17. A similar brake assembly is provided for the rear wheel.

The components 11–14, 16–19, 21–24 and 26 are typically provided in scooters known in the prior art. The front and rear wheels freewheel to enable forward motion, the handlebars are used to steer the front wheel 21, and the brake assembly 22 is used to slow and stop the scooter.

The invention further provides a drive mechanism to propel the scooter forward. A pedal 27 is pivotally secured to the platform 11 by a hinge, and is resiliently biased by a torsion spring 28 to extend obliquely upwardly, as shown in FIG. 1. A drive link 29 is pivotally connected to the bottom surface of the pedal 27, and extends through a slot in the platform. Beneath the platform, a sprocket wheel 31 is rotatably mounted on a shaft 32 supported by brackets secured to the footboard 11. The lower end of the drive link 29 is secured eccentrically to the sprocket wheel 31 by a pin 33. Another sprocket wheel assembly 34 is mounted on the rear axle 13, and includes a ratchet gear, similar to a typical bicycle, that permits freewheeling of the rear wheel 14. An endless loop chain 36 extends about the sprocket wheels 31 and 34 to transfer rotational motion therebetween.

To use the drive mechanism described above, the scooter rider depresses the pedal 27 with one foot while standing on the footboard 11. The pedal translates the link 29, which in turn rotates the sprocket wheel 31 in a clockwise direction. Chain 36 is thus circulated as shown by the arrows in FIG. 1, and the sprocket wheel assembly 34, together with the rear wheel 14, is rotated by the chain 36 in a clockwise direction, propelling the scooter forward. The process is reiterated to gain and maintain velocity.

With regard to FIGS. 4–6, a further embodiment of the invention utilizes many of the components described previously, which are labeled with the same reference numerals. Mounted on the shaft 32 beneath the footboard 11 is a drive gear 41, and the lower end of drive link 29 is secured eccentrically to the gear 41 by pin 33. A further shaft 42 is also mounted beneath the footboard 11, and a spur gear 43 is supported on the shaft 42. Also supported on the shaft 42 is a sprocket wheel 44, and the endless chain 36 extends about the sprocket wheel 44 and the sprocket assembly 34 on the rear axle.

In the embodiment of FIGS. 4–6, depression of the pedal causes the drive link 29 to rotate the drive gear 41 counterclockwise, and the spur gear 43 meshing with gear 41 is driven clockwise. The sprocket wheel 44 thus circulates the chain clockwise to drive the rear wheel 14 as described previously to propel the scooter. The gear ratio of gears 41 and 43 increases the speed that is attainable with the drive mechanism in comparison with the previous embodiment.

With regard to FIGS. 7–9, a further embodiment of the invention utilizes many of the components described previously, which are labeled with the same reference numerals. A slot 51 is formed in a rear portion of the footboard 11, and a pedal 52 is pivotally joined to the footboard 11 adjacent to the slot 51. Torsion spring 53 resiliently urges the pedal obliquely upwardly as shown in FIG. 7. A shaft 54 is mounted on the upper surface of the footboard 11 by brackets or bearing blocks, the shaft 54 spanning at least a portion of the slot 51. A sprocket wheel 56 is supported on the shaft, and at least a portion of the sprocket wheel 56 extends into the slot 51. The upper end of drive link 57 is pivotally joined to the pedal 52, and the lower end is pivotally joined by pin 58 to the sprocket wheel 56 in eccentric fashion. An endless chain loop 59 extends about the sprocket wheel 56 and the sprocket assembly 34 on the rear axle. It is significant that a substantial portion of the sprocket wheel 56 extends above the footboard 11, and very little of the drive mechanism extends below the footboard, so that ground clearance of the scooter is not impaired by the drive mechanism.

To use the drive mechanism of FIGS. 7–9, the scooter rider depresses the pedal 52 with one foot (preferably rear foot) while standing on the footboard 11. The pedal translates the link 57, which in turn rotates the sprocket wheel 56 in a clockwise direction. Chain 59 is thus circulated as shown by the arrows in FIG. 7, and the sprocket wheel assembly 34, together with the rear wheel 14, is rotated by the chain 59 in a clockwise direction, propelling the scooter forward. The process is reiterated to gain and maintain velocity.

An additional embodiment of the invention, shown in FIGS. 10–12, utilizes many of the components described previously, which are labeled with the same reference numerals. Mounted on the shaft 54 is a drive gear 61, the drive gear 61 being disposed in the slot 51. The upper end of the drive link 57 is pivotally secured to the pedal 52, and the lower end of drive link 57 is secured eccentrically to the gear 61 by pin 63. A further shaft 62 is also mounted on the upper surface of the footboard 11, parallel to shaft 54, and a spur gear 64 is supported on the shaft 62. Also supported on the shaft 62 is a sprocket wheel 66, and the endless chain 59 extends about the sprocket wheel 66 and the sprocket assembly 34 on the rear axle. As in the embodiment of FIGS. 7–9, substantially all of the drive mechanism is disposed above the ground clearance of the scooter and, as in the embodiment of FIGS. 4–6, the compound gear drive increases the velocity potential of the drive mechanism.

Depression of the pedal 52 causes the drive link 57 to rotate the drive gear 61 counterclockwise, and the spur gear 64 meshing with gear 61 is driven clockwise. The sprocket wheel 66 thus circulates the chain clockwise, as shown by the arrows in FIG. 10, to drive the sprocket assembly 34 and the rear wheel 14 and propel the scooter.

Figure 14:
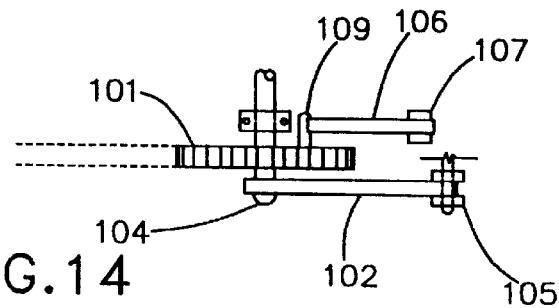
FIG. 14 is a top view of the ratchet mechanism of the invention, taken along line 14—14 of FIG. 13.
Figure 13:
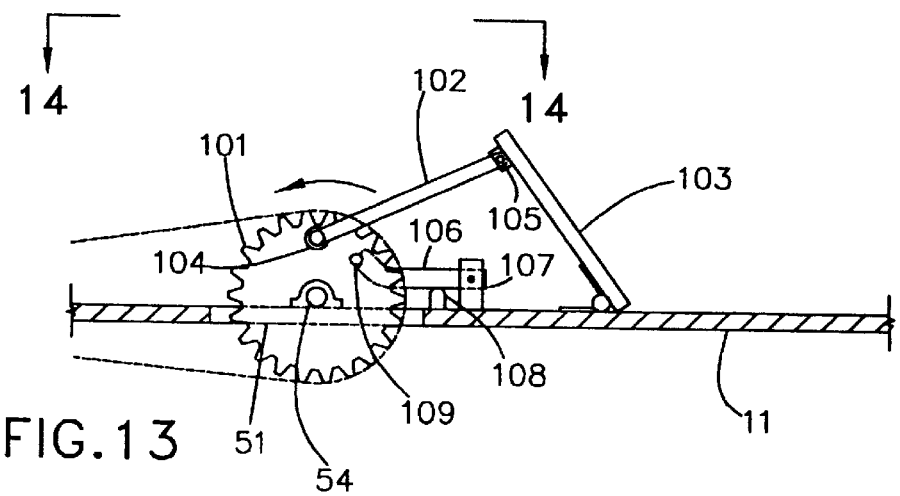
FIG. 13 is a side elevation of a ratchet mechanism of the invention which may be applied to any previous embodiment.

A further aspect of the invention is a unidirectional ratchet mechanism, as depicted in FIGS. 13 and 14. A slot 51 is formed longitudinally in the footboard 11, and a pedal 103 is pivotally joined to the footboard 11 adjacent to the slot 51. A shaft 54 is mounted on the upper surface of the footboard by brackets or bearing blocks, and shaft 54 spanning at least a portion of the slot 51. A sprocket wheel or gear wheel 101 is rotatably mounted on the shaft 54, and at least a portion of the wheel 101 extends into the slot 51. The upper end of drive link 102 is pivotally joined to the pedal 103, and the lower end is pivotally joined by pin 104 to wheel 101 in eccentric fashion.

The ratchet mechanism includes a pin 109 extending from the wheel 101, the pin 109 being radially spaced from the shaft 54 and disposed parallel thereto. A latch arm 106 having a distal dogleg configuration is supported by a pivot pin 107, the arm 106 extending generally parallel to the wheel 101. A stop 108 is mounted on the footboard 11 adjacent to the pin 107 to limit the counter-clockwise rotation of the arm 106 about the pin 107. The lower edge of the distal dogleg portion of the arm 106 is convex and disposed in the circular path traveled by the pin 109 when the wheel 101 rotates. If the wheel rotates counterclockwise, as shown by the arrow in FIG. 13, the pin 109 will strike the convex edge and rotate the arm 106 clockwise, allowing the pin 109 to pass and continue its counterclockwise trajectory reiteratively.

The end surface of the distal dogleg portion of the arm 106 is provided with a generally concave recess dimensioned and disposed to engage and retain the pin 109. If the wheel 101 rotates clockwise, the pin 109 will encounter and be captured by the concave recess, rotating the arm 106 counterclockwise. The stop 108 limits the arm 106, and the arm 106 prevents further clockwise rotation of the wheel 101.

It should be noted that the spacing of the pin 109 and the pin 104 is determined so that the drive link 102 is disposed and poised to initiate counterclockwise rotation of the wheel 101 upon initial depression of the pedal 103. Thus whenever the latch arm 106 checks the clockwise rotation of wheel 101, further depression of the pedal 103 will initiate rotation of the wheel 101 in the proper counterclockwise direction to propel the vehicle in a forward direction. The mechanism described above with reference to FIGS. 13 and 14 may be applied to any of the previous embodiments in which counterclockwise rotation of the gear wheel or sprocket wheel is required to produce forward propulsion of the vehicle.

Figure 16:
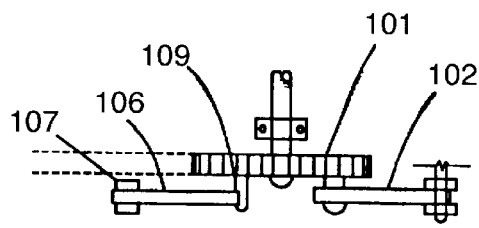
FIG. 16 is a top view of the further embodiment of the ratchet mechanism of the invention, taken along line 16—16 of FIG. 15.
Figure 15:
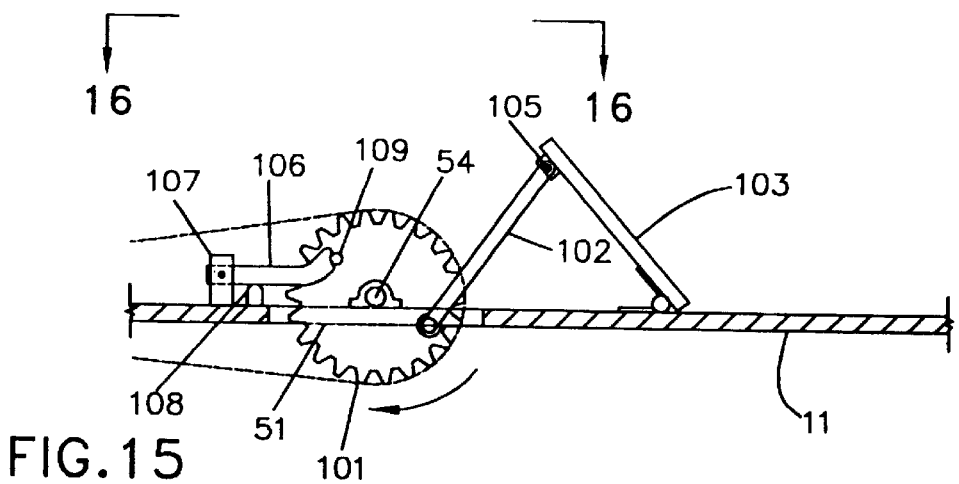
FIG. 15 is a side elevation of a further embodiment of the ratchet mechanism of the invention, which may be applied to any previous embodiment.

Another embodiment of the unidirectional ratchet mechanism, shown in FIGS. 15 and 16, employs many of the components described with reference to FIGS. 13 and 14, and are accorded the same reference numerals. As before, a gear wheel or sprocket wheel 101 is mounted on a shaft 54 in a slot 51 in the footboard 11, and pedal 103 is joined by drive link 102 to a pin 104 mounted eccentrically on the wheel 101. The pivoting latch arm assembly 106–108 is secured to the footboard adjacent to the opposite end of the slot 51 (as compared to the previous embodiment), and the distal dogleg end of the arm 106 is disposed to intersect the circular path of pin 109 extending from the wheel 101 parallel to shaft 54 and eccentric thereto. This mounting reverses the action of the latch arm assembly; i.e., it permits free rotation of the wheel 101 in a clockwise direction, while it prevents more than one revolution of the wheel 101 in the counterclockwise direction.

It should be noted that the spacing of the pin 109 and the pin 104, which is diametric opposition, is determined so that the drive link 102 is disposed and poised to initiate clockwise rotation of the wheel 101 upon initial depression of the pedal 103. Thus whenever the latch arm 106 checks the counterclockwise rotation of wheel 101, further depression of the pedal 103 will initiate rotation of the wheel 101 in the proper clockwise direction to propel the vehicle in a forward direction. The mechanism described above with reference to FIGS. 15 and 16 may be applied to any of the previous embodiments in which clockwise rotation of the gear wheel or sprocket wheel is required to produce forward propulsion of the vehicle.

Although the various embodiments of the invention have been described with reference to a scooter having a steerable front wheel, it may be applied to any personal vehicle having a footboard supported at opposed ends by a pair of wheels, such as, but not limited to, a skateboard.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiments described are selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. In a personal vehicle having a footboard for supporting a rider and a pair of ground-engaging wheels disposed at opposed ends of the footboard, the improvement comprising:
 a mechanism for propelling the vehicle, including a first sprocket wheel assembly and a second sprocket wheel assembly, and an endless loop chain extending about said first and second sprocket wheel assemblies, said second sprocket wheel assembly being operatively connected to one of said wheels in a driving relationship;
 means for mounting said first sprocket wheel assembly on an upper surface of said footboard;
 a pedal pivotally mounted on said footboard; and,
 a drive link having one end pivotally secured to said pedal and an opposed end pivotally secured to said first sprocket wheel assembly in an eccentric relationship, whereby reiterative depression of said pedal reciprocates said drive link to rotate said first sprocket wheel assembly and circulate said chain to rotate said second sprocket wheel assembly and said one wheel and propel said vehicle.

2. The improved personal vehicle of claim 1, further including a slot formed in said footboard, said first sprocket wheel assembly including a portion extending into said slot.

3. The improved personal vehicle of claim 1, wherein said second sprocket wheel assembly includes a ratchet mechanism that permits said chain to rotate said second sprocket wheel assembly in only one rotational direction corresponding to forward propulsion of said vehicle.

4. The improved personal vehicle of claim 1, wherein said first sprocket wheel assembly includes a unidirectional ratchet mechanism that permits rotation of said first sprocket wheel assembly in a first direction and blocks rotation of said first sprocket wheel assembly in a second direction, said rotation in said first direction corresponding to propulsion of said vehicle in a forward direction.

5. In a personal vehicle having a footboard for supporting a rider and a pair of ground-engaging wheels disposed at opposed ends of the footboard, the improvement comprising:
 a mechanism for propelling the vehicle, including a first sprocket wheel assembly and a second sprocket wheel assembly, and an endless loop chain extending about said first and second sprocket wheel assemblies, said second sprocket wheel assembly being operatively connected to one of said wheels in a driving relationship;
 a pedal pivotally mounted on said footboard;
 a drive link having one end pivotally secured to said pedal and an opposed end pivotally secured to said first sprocket wheel assembly in an eccentric relationship, whereby reiterative depression of said pedal reciprocates said drive link to rotate said first sprocket wheel assembly and circulate said chain to rotate said second sprocket wheel assembly and said one wheel and propel said vehicle;
 wherein said first sprocket wheel assembly includes a unidirectional ratchet mechanism that permits rotation of said first sprocket wheel assembly in a first direction and blocks rotation of said first sprocket wheel assembly in a second direction, said rotation in said first direction corresponding to propulsion of said vehicle in a forward direction,
 said unidirectional ratchet mechanism including a pin extending from said first sprocket wheel assembly and disposed eccentric thereto,
 a latch arm, and means for pivotally supporting said latch arm adjacent to said first sprocket wheel assembly;
 said latch arm including a distal end disposed to intersect the circular path of said pin during rotation of said first sprocket wheel assembly.

6. The improved personal vehicle of claim 5, wherein said distal end of said latch arm includes a first portion disposed to be engaged by and permit passage of said pin when said first sprocket wheel assembly rotates in said first direction.

7. The improved personal vehicle of claim 6, wherein said distal end of said latch arm includes a second portion disposed to be engaged by said pin when said first sprocket wheel assembly rotates in said second direction, said second portion engaging and retaining said pin and blocking further rotation of said first sprocket wheel assembly in said second direction.

8. The improved personal vehicle of claim 7, wherein said blocking action of said second portion of said distal end of said latch arm disposes said sprocket wheel assembly in a predetermined angular disposition in which said drive link and pedal are disposed to initiate rotation of said first sprocket wheel assembly in said first direction.

9. In a personal vehicle having a footboard for supporting a rider and a pair of ground-engaging wheels disposed at opposed ends of the footboard, the improvement comprising:
 a mechanism for propelling the vehicle, including a first sprocket wheel assembly and a second sprocket wheel assembly, and an endless loop chain extending about said first and second sprocket wheel assemblies, said second sprocket wheel assembly being operatively connected to one of said wheels in a driving relationship;
 means for mounting said first sprocket wheel assembly on an upper surface of said footboard;
 said first sprocket wheel assembly including a first gear wheel disposed to mesh with a second gear wheel, and a sprocket wheel mounted coaxially with said second gear wheel for rotation in common therewith;
 a pedal pivotally mounted on said footboard,
 a drive link having one end pivotally secured to said pedal and an opposed end pivotally secured to said first gear wheel in an eccentric relationship, whereby reiterative depression of said pedal reciprocates said drive link to rotate said first gear wheel and counter-rotate said second gear wheel and said sprocket wheel to circulate said chain to rotate said second sprocket wheel assembly and said one wheel and propel said vehicle.

10. The improved personal vehicle of claim 9, further including a slot formed in said footboard, said first sprocket wheel assembly including a portion extending into said slot.

11. The improved personal vehicle of claim 9, wherein said first sprocket wheel assembly includes a unidirectional ratchet mechanism that permits rotation of said first gear wheel in a first direction and blocks rotation of said first gear wheel in a second direction, said rotation of said first gear wheel in said first direction causing propulsion of said vehicle in a forward direction.

12. The improved personal vehicle of claim 11, wherein said unidirectional ratchet mechanism includes a pin extending from said first gear wheel and disposed eccentric thereto, a latch arm, and means for pivotally supporting said latch arm adjacent to said first gear wheel;

said latch arm including a distal end disposed to intersect the circular path of said pin during rotation of said first gear wheel.

13. The improved personal vehicle of claim 12, wherein said distal end of said latch arm includes a first portion disposed to be engaged by and permit passage of said pin when said first gear wheel rotates in said first direction.

14. The improved personal vehicle of claim 13, wherein said distal end of said latch arm includes a second portion disposed to be engaged by said pin when said first gear wheel rotates in said second direction, said second portion engaging and retaining said pin and blocking further rotation of said first gear wheel in said second direction.

15. The improved personal vehicle of claim 14, wherein said blocking action of said second portion of said distal end of said latch arm disposes said first gear wheel in a predetermined angular disposition in which said drive link and pedal are disposed to initiate rotation of said first gear wheel in said first direction.

* * * * *